United States Patent

[11] 3,559,530

| [72] | Inventors | Hans O. Wagner<br>Dusseldorf-Lohausen;<br>Gert Traugott, Buderich, Germany |
|---|---|---|
| [21] | Appl. No. | 778,230 |
| [22] | Filed | Nov. 22, 1968 |
| [45] | Patented | Feb. 2, 1971 |
| [73] | Assignee | Schiess Aktiengesellschaft<br>Dusseldorf, Germany |
| [32] | Priority | Nov. 25, 1967 |
| [33] | | Germany |
| [31] | | P1,627,119 |

[54] PORTAL MILLING MACHINE
2 Claims, 1 Drawing Fig.

[52] U.S. Cl. .................................................. 90/14,
90/15
[51] Int. Cl. ...................................................... B23c 1/10
[50] Field of Search .......................................... 90/15, 11,
164, 38, 42, 41, 15.1, 14; 77/3

[56] References Cited
UNITED STATES PATENTS

| 2,564,180 | 8/1951 | Turrettini ..................... | 90/164-X |
| 2,730,306 | 1/1956 | Miller .......................... | 90/11-X |
| 3,296,932 | 1/1967 | Pankonin et al. ............. | 90/41-X |

*Primary Examiner*—Gil Weidenfeld
*Attorney*—Walter Becker

ABSTRACT: A portal milling machine for machining work pieces of considerable height and length, in which the transverse beam carrying carriage means movable in the longitudinal direction of said beam and transverse thereto is displaceable on supporting means arranged on opposite sides of and at a higher level than a chucking plate at the bottom of a longitudinal pit below said beam while at least one vertical arm connected to said beam extends downwardly into said pit and has displaceably mounted thereon an additional carriage with a substantially horizontal axially displaceable spindle.

PATENTED FEB 2 1971
3,559,530
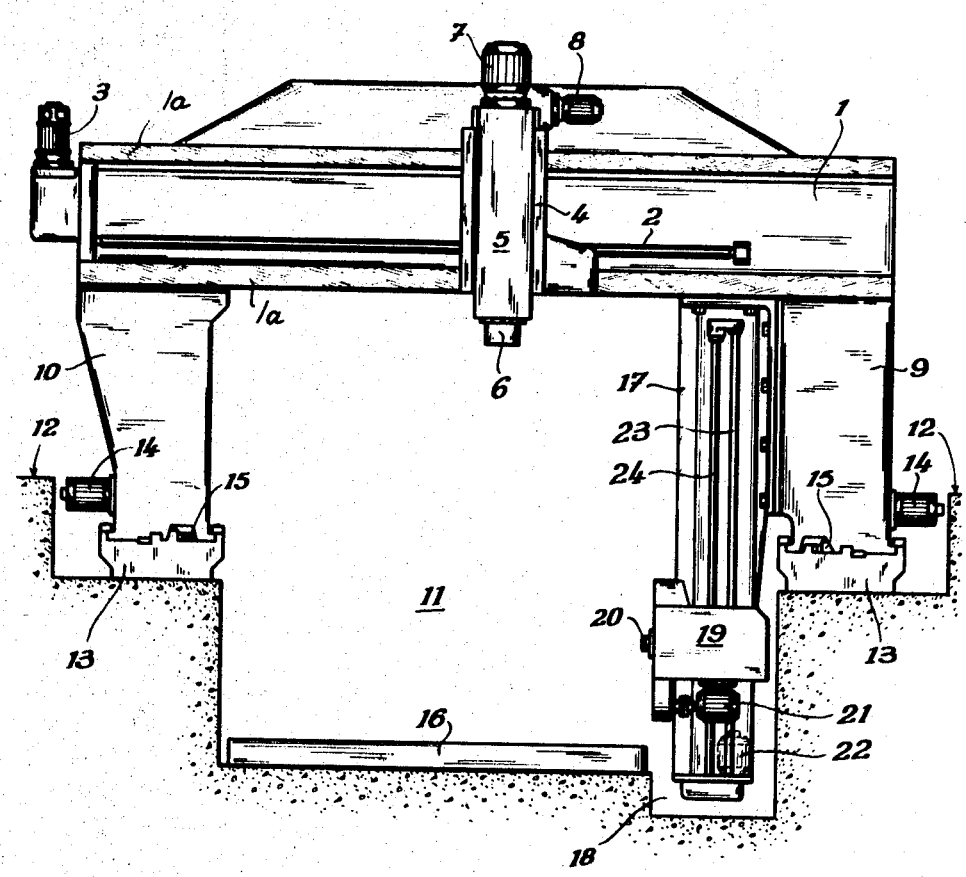
INVENTORS.
Hans O. Wagner
Gert Traugott
By
Walter Becker.

3,559,530

PORTAL MILLING MACHINE

The present invention relates to a portal milling machine for machining work pieces of considerable height and length, with a rectilinear direction of movement of the tools with regard to the work piece and, more specifically, concerns a portal milling machine of the above mentioned type having a transverse beam supporting at least one transverse beam carriage which is movable along said transverse beam and is equipped with a vertically displaceable tool slide or carriage, said portal milling machine being provided with at least one vertically displaceable lateral carriage.

With heretofore known longitudinal milling machines, the machine frame comprises two stands, a traverse beam interconnecting said stands, a transverse beam displaceable in vertical direction on guiding means provided on said stands, and a machine bed on which in suitable guiding means the machine table is movable. Displaceably arranged on the transverse beam is at least one transverse beam carriage with a milling slide or carriage displaceable thereon. The machine stands are firmly threadedly connected to the machine bed. The stands may, for purposes of laterally machining work pieces, additionally be equipped with lateral carriages.

The work pieces to be machined are chucked onto the machine table. With large work pieces which have to be machined with high precision, the machine has to have considerable dimensions with regard to the height of the machine bed and the machine table. Similarly, work pieces with large dimensions require large machine dimensions inasmuch as the length of the machine corresponds to twice the length of the work piece similar to planing machines.

It is, therefore, an object of the present invention to provide a portal milling machine for machining work pieces of great height and length with rectilinear direction of movement of the tool with regard to the work piece, which will permit a proper milling of the work piece while the weight of the machine and the space requirement are relatively low.

This object and other objects and advantages of the invention will appear more clearly from the following specification in connection with the accompanying drawing diagrammatically illustrating a portal milling machine according to the present invention.

The milling machine according to the present invention is characterized primarily in that the transverse beam extends transverse over a longitudinal rectangular work piece chucking plate which is located below the floor level while the ends of said transverse beam are connected to longitudinally in unison displaceable bed carriages at both sides of the work piece chucking plate. The plane of displacement of said bed carriages is located at the level of the floor while at least one of said be bed carriages is equipped with a vertically extending arm having a displaceable lateral carriage arranged thereon. The free end of said last mentioned lateral carriage extends to the chucking plane of the work piece chucking plate.

According to a further development of the invention, the transverse beam may at both sides be provided with carriage guiding means and may on each side carry at least one transverse beam carriage. In view of the arrangement of the transverse beam carriages at the front and rear side of the transverse beam, the field of employment of the machine can be considerably broadened and, accordingly, the machining time for the work pieces can be greatly reduced.

Referring now to the drawing in detail, the diagrammatically illustrated portal milling machine comprises a transverse beam 1 with a longitudinally extending threaded spindle 2 which is driven by a motor 3 and is provided for longitudinally displacing the transverse beam carriage 4. The transverse beam carriage 4 is provided with the vertically displaceable milling carriage 5 having a milling spindle 6. The milling carriage 5 carries a spindle drive motor 7. Its vertical adjustment is effected by a motor 8 on transverse beam carriage 4.

The ends of the transverse beam 1 rest on bed carriages 9 and 10 and are firmly connected thereto. The two bed carriages 9 and 10 are arranged on both sides of the longitudinal rectangular pit 11 the bottom surface of which is considerably below the floor level 12. Somewhat below the floor level 12 and along the pit 11 there are at both sides provided guiding beds 13 on which both carriages 9 and 10 with the transverse beam 1 are displaceable together. To this end, there are provided driving motors 14 which through the intervention of pinions mesh with a gear rack 15 in the guiding beds 13. The work piece chucking plate 16 is anchored to the bottom of the pit 11. Laterally on the bed carriage 9 there is provided a vertically extending arm 17 which is connected to the bed carriage 9 and the transverse beam 1 by bolts. The free end of the arm 17 extends below the chucking plane of the work piece chucking plate 16 for which purpose the pit 11 is provided with a groove 18. The motors 14 may be synchronous motors to assure uniform movement of carriages 9, 10.

Vertically displaceable on the arm 17 is a lateral carriage 19 with axially displaceable milling spindle 20. The milling spindle 20 is driven by a motor 21 through the intervention of a shaft 23. The adjustment of the lateral carriage 19 is effected by a motor 22 which drives the threaded spindle 24.

As will be seen from the drawing, within the pit 11 a work piece of considerable height, length and width can be chucked to the work piece chucking plate 16 and remains stationary during the milling operation. The machining movements are carried out by the bed carriages 9 and 10 together with the transverse beam 1 and the arm 17 so that the tools of the milling carriage 5 on the transverse beam 1 and on the lateral carriage 19 will be able to machine the top side and a lateral surface of the work piece.

It is also possible to provide the transverse beam 1 with more than one transverse beam carriage. When the transverse beam 1, in addition to the front side, also has its rear side provided with guiding means 1a and a threaded spindle 2 adapted to be driven, it is possible additionally to arrange transverse beam carriages on the rear side of the transverse beam 1 whereby the field of employment of the machine will be broadened and the machining time for the work pieces will be reduced. Furthermore, there exists the possibility to provide both bed carriages 9 and 10 with arms 17 having lateral carriages 19 in which instance the transverse beam 1 has to be correspondingly longer and the pit 11 has to be correspondingly wider.

As will be evident from the above, the present invention provides a portal milling machine in which, in contrast to the heretofore known portal longitudinal milling machines, the work piece is not moved during the machining operation. Instead, the transverse beam is moved together with the bed carriage carrying said transverse beam. The height of the bed carriage may, in contrast to the stands for the portal longitudinal milling machines, be rather short inasmuch as the height necessary for the work piece is created by the fact that the work piece is chucked at a corresponding distance below the floor level. The mass of the portal of the machine is considerably less than the mass of the machine frame of heretofore known portal longitudinal milling machines whereby it is possible with relatively low cross-sectional dimensions of the bed carriage to design the portal distorsion resistant and to move back and forth only such mass which is considerably less than the mass of the machine frame of heretofore known portal longitudinal milling machines.

The provision of at least one vertical arm on the bed carriage additionally makes it possible by means of a lateral carriage to carry out a lateral machining of the work piece. Also in this instance the work piece remains stationary on its chucking plate.

By arranging the work piece chucking plate below the floor level, i.e. below the plane of displacement of the bed carriage, it is furthermore made possible effectively to distribute the cutting forces below and above the bed plane which is due to the fact that the distribution of the moment in view of the lower overall height above the bed plane is considerably more favorable.

It is, of course, to be understood that the present invention is, by no means, limited to the particular construction shown

We claim:

1. In combination with a floor having a pit therein with longitudinal chucking means connected to the bottom of said pit for chucking a work piece thereto, a portal milling machine which comprises: a transverse beam extending transverse to said chucking means and in vertically spaced relationship thereto, lateral guiding means located on opposite sides of said pit at approximately the level of said floor, two bed carriages movable on said lateral guiding means and respectively connected to the ends of said transverse beam and supporting the latter, driving means drivingly connected to said bed carriages for moving the same in unison with each other, at least one of said bed carriages having a substantially vertical arm connected thereto, and lateral carriage means vertically displaceably mounted on said substantially vertical arm, the lower end of said arm extending at least to the chucking plane of said chucking means permitting downward tool side machining.

2. An arrangement in combination below the floor according to claim 1, in which said transverse beam is provided with transverse guiding means extending in the longitudinal direction of said transverse beam, and which includes transverse beam carriage means displaceably mounted on said transverse guiding means and including additional carriage means displaceable in a direction transverse to said transverse guiding means.